United States Patent [19]

Weber et al.

[11] Patent Number: 4,531,357
[45] Date of Patent: Jul. 30, 1985

[54] GAS TURBINE ENGINE WITH AN OPERATING-FUEL COOLED GENERATOR

[75] Inventors: Thomas Weber, Oberursel; Franz Haselbauer, Münzenberg, both of Fed. Rep. of Germany

[73] Assignee: Klöckner-Humboldt-Deutz Aktiengesellschaft, Cologne, Fed. Rep. of Germany

[21] Appl. No.: 494,634

[22] Filed: May 16, 1983

[30] Foreign Application Priority Data

May 19, 1982 [DE] Fed. Rep. of Germany ....... 3218927

[51] Int. Cl.³ ............................................. F01D 25/12
[52] U.S. Cl. .................................. 60/39.07; 60/39.83; 290/52; 310/57
[58] Field of Search ................. 60/39.83, 39.07, 39.33, 60/39.75; 165/104.33; 123/542, 557; 290/52; 310/54, 57, 58

[56] References Cited

U.S. PATENT DOCUMENTS

| 771,468 | 10/1904 | Falk | 310/57 |
|---|---|---|---|
| 1,551,295 | 8/1925 | Fletcher | 310/57 |
| 2,180,168 | 11/1939 | Puffer | 290/52 |
| 2,414,532 | 1/1947 | Johns et al. | 310/57 |
| 2,566,618 | 9/1951 | Lindsey | 290/52 |
| 2,831,662 | 4/1958 | Hirsch | 310/57 |
| 2,964,659 | 12/1960 | Steele, III et al. | 310/57 |
| 3,009,072 | 11/1961 | Mossay | 310/57 |
| 3,184,624 | 5/1965 | Solomon | 310/57 |
| 3,567,975 | 3/1971 | Biesack | 310/57 |
| 4,253,031 | 2/1981 | Frister | 290/52 |

FOREIGN PATENT DOCUMENTS

| 216617 | 8/1961 | Austria | 310/57 |
|---|---|---|---|
| 1056255 | 4/1959 | Fed. Rep. of Germany | 310/58 |
| 684240 | 6/1930 | France | 310/57 |
| 754781 | 8/1956 | United Kingdom | 310/57 |

OTHER PUBLICATIONS

ZTL-Studie 1978 der Klöckner-Humboldt-Deutz AG, "Thrust Engine for Brief Duration Without Gearing for Auxiliary Devices", Section 3.5.2 and FIG. 12.

Primary Examiner—Carlton R. Croyle
Assistant Examiner—Jeffrey A. Simenauer
Attorney, Agent, or Firm—Becker & Becker, Inc.

[57] ABSTRACT

A gas turbine engine for aircraft. A generator, which undertakes to supply energy for auxiliary devices, is spaced between a compressor and a turbine. A heat exchanger which surrounds the generator housing, and through which compressor air and fuel flow, is provided for cooling the generator. The compressor air which is cooled by the fuel is supplied to the rotor of the generator, and possibly to a bearing of the rotor shaft.

7 Claims, 3 Drawing Figures

GAS TURBINE ENGINE WITH AN OPERATING-FUEL COOLED GENERATOR

BACKGROUND OF THE INVENTION

The present invention relates to a gas turbine engine for an aircraft, and includes a compressor, a rotor shaft, and at least one turbine; a generator for supplying energy to auxiliary devices of the aircraft is arranged between the compressor and the turbine. The generator is driven by the rotor shaft, and comprises a generator housing, a generator stator, and a generator rotor; the generator is cooled by turbine fuel.

FIELD OF THE INVENTION

Gas turbine engines, which are used for temporary operation in pilotless aircraft, are distinguished by a very simple construction. For supplying power to the auxiliary devices of the aircraft, these gas turbine engines have a generator which is driven directly by the elongated rotor shaft which is mounted ahead of the compressor in the compressor hub. In so doing, the gas turbine engine is elongated, and, with regard to flow dynamics, the generator has a negative effect on the intake cross section of the compressor.

DESCRIPTION OF THE PRIOR ART

It has therefore already been proposed with one known gas turbine engine of the aforementioned general type to arrange the generator between the compressor and the turbine and to cool it with turbine fuel (ZTL-Studie 1978 der Klöckner-Humboldt-Deutz AG "Schubtriebwerk für kurze Lebensdauer ohne Getriebe für Hilfsgeräte" (thrust engine for brief duration without gearing for auxiliary devices), section 3.5.2 and FIG. 12). This generator arrangement and generator cooling, which was only addressed as a basic approach, involves considerable difficulties. The manufacturing cost of the gas turbine engine must not rise due to this altered overall construction and the then necessary cooling, and no negative effects on the supply of fuel to the combustion chamber must be produced.

It is therefore an object of the present invention to eliminate these problems, i.e. to ensure an intensive cooling of the generator stator, the generator rotor, as well as other possible parts of the gas turbine engine in the region of the rotor shaft, and to still have a simple and economical construction of the gas turbine engine.

BRIEF DESCRIPTION OF THE DRAWINGS

This object, and other objects and advantages of the present invention, will appear more clearly from the following specification in conjunction with the accompanying drawings.

SUMMARY OF THE INVENTION

Figure 1:
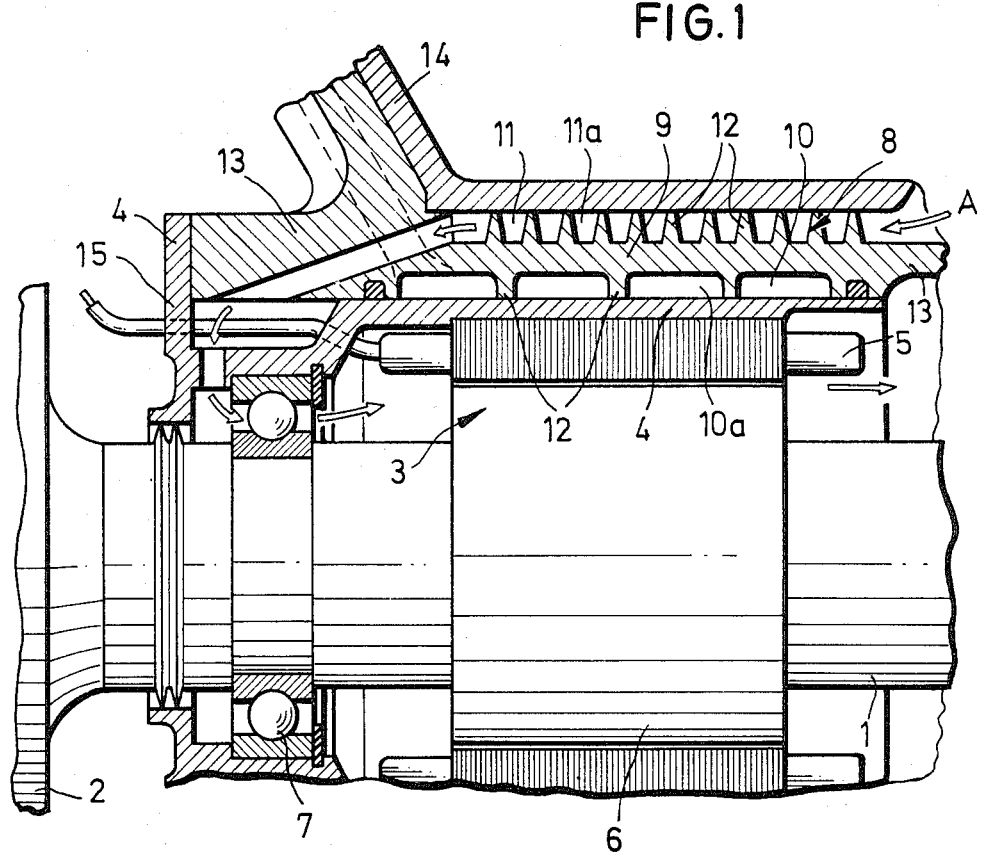
FIG. 1 a schematic partial view of a gas turbine engine, and in particular is a longitudinal section of one inventive embodiment through a gas turbine housing, a rotor shaft bearing, and a schematically illustrated generator.
Figure 2:
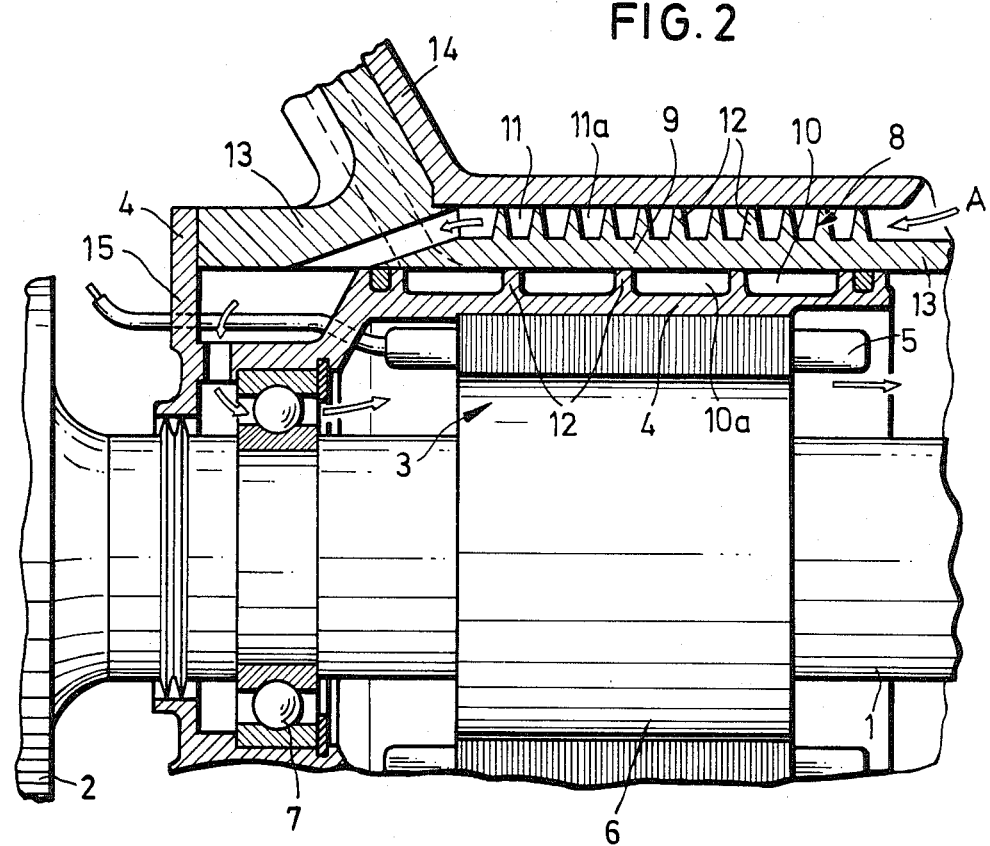
FIG. 2 shows the annular or ring-shaped structure of the heat exchanger.
Figure 3:
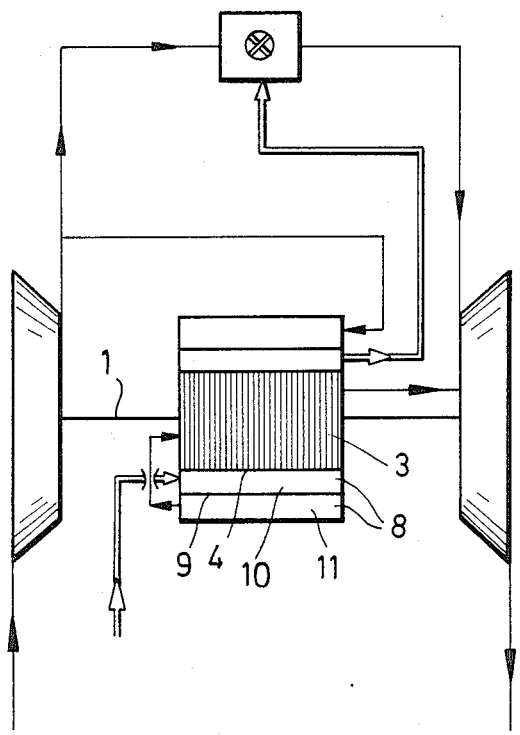
FIG. 3 shows further details regarding the supply of air to the turbine.

The gas turbine engine of the present invention is characterized primarily in that the generator housing is surrounded by a heat exchanger which, by means of a partition which essentially extends coaxial to the rotor shaft, divides the housing into two chambers through which cooling medium flows; of these chambers, an inner primary chamber has turbine fuel flowing therethrough, and an outer secondary chamber has compressor air flowing therethrough, with the cooled compressor air being adapted to be supplied via a direction-changing arrangement to the generator rotor and possibly to at least one rotor bearing.

The inventive heat exchanger, which radially surrounds the generator, intensively cools the generator stator by means of its primary chamber, through which turbine fuel flows. On the other side, this primary chamber borders on the secondary chamber via the partition; a partial stream of the compressor air is guided through this secondary chamber, so that the compressor air can be cooled under the effect of the convective heat transfer to the fuel, and is subsequently available for cooling the generator rotor and possibly the rotor shaft bearing.

Pursuant to one specific embodiment of the present invention, the heat transfer to the partition can be improved by the provision of ribs. These ribs can form helically extending cooling channels not only in the primary chamber but also in the secondary chamber.

To simplify manufacture and assembly, both sides of the partition can be provided with suitable ribs. During assembly of the gas turbine engine, the smooth generator housing is placed in the gas turbine housing, so that cooling channels are formed between the generator housing, the partition, and the ribs. The partition may be a part of the gas turbine housing. Furthermore, an insulated cover may be placed over the partition, so that cooling channels for the compressor air can be formed between this cover and the partition.

It is also possible to make the inner side of the partition smooth, and to provide the generator housing with radially projecting ribs which border on the smooth side of the partition, so that cooling channels for the fuel are available between the generator housing and the partition.

It is furthermore proposed, finally also to supply the partial stream of the compressor air which already serves for cooling the generator and the rotor shaft bearing to the wheel of the turbine for cooling the same. In this manner, a particularly favorable possibility for the cooling of the wheel results.

DESCRIPTION OF A PREFERRED EMBODIMENT

Referring now to the drawings in detail, a rotor shaft 1 of a gas turbine engine is shown. A partially illustrated compressor wheel 2, a generator 3 for supplying power to auxiliary devices, and a non-illustrated wheel of a turbine are arranged one after the other on the rotor shaft 1. The generator 3 has a housing 4, a stator 5, and a rotor 6. The rotor shaft 1 is mounted in the generator housing 4, for example by means of a bearing 7. Furthermore, the generator housing 4 is surrounded by a heat exchanger 8 which divides the housing 4 by means of a partition 9 into a primary chamber 10, through which turbine fuel flows, and a secondary chamber 11, through which compressor air flows. Ribs 12, which are unitary with the partition 9, project not only into the primary chamber 10, but also into the secondary chamber 11; these ribs 12 respectively form cooling channels 10a and 11a. As is also evident from the drawing, the partition 9 is part of a gas turbine housing 13 in which the generator housing 4 is placed. The ribs 12 on the outer side of the partition 9 are closed by an insulated cover 14 for the purpose of forming the cooling channels 11a. The gas turbine housing 13 and the generator housing 4 together form a direction-changing arrangement 15 for guiding cooled compressor air toward the generator rotor 6.

A partial stream of the compressor air, designated in the drawing with the reference symbol A, flows through the secondary chamber 11 of the heat exchanger 8 and is cooled by the turbine fuel which flows through the primary chamber 10 and from there by means of a fuel pump to a non-illustrated combustion chamber. This cooled compressor air is subsequently conveyed by the direction-changing arrangement 15 into the interior of the generator housing 4, where it cools the rotor shaft bearing 7, the generator rotor 6, and possibly a non-illustrated wheel of the turbine. In this manner, a particularly intensive cooling of the generator, the rotor shaft bearing, and possibly the turbine wheel can be achieved at little structural expense.

The present invention is, of course, in no way restricted to the specific disclosure of the specification and drawing, but also encompasses any modifications within the scope of the appended claims.

What we claim is:

1. A gas turbine engine for aircraft, comprising:
   a compressor;
   a rotor shaft;
   at least one turbine;
   a generator which can be cooled by turbine fuel and is disposed between said compressor and said turbine, said generator being driven by said rotor shaft and serving to supply energy to auxiliary devices of said aircraft, said generator including a generator housing, a stator, and a rotor;
   a heat exchanger which co-axially surrounds said generator housing, said heat exchanger including a partition which extends essentially coaxial to said rotor shaft and divides said heat exchanger into two chambers through which cooling medium flows; said two radially sequentially located and axially continuous flow chambers including a radially inner primary chamber through which turbine fuel flows, and a radially outer secondary chamber through which compressor air flows to be cooled by said turbine fuel flowing through the radially inner primary chamber whereby the generator stator is also cooled by said turbine fuel flowing through the radially inner primary chamber; and
   direction-changing means associated with said generator housing and said heat exchanger for furthermore supplying turbine-fuel cooled compressor air to said rotor which is cooled thereby.

2. A gas turbine engine according to claim 1, in which said rotor shaft is mounted in said generator housing by means of at least one bearing, said direction-changing means also supplying cooled compressor air to said at least one bearing.

3. A gas turbine engine according to claim 1, which includes ribs disposed in at least one of said primary and secondary chambers of said heat exchanger.

4. A gas turbine engine according to claim 3, which includes a gas turbine housing in which said generator housing is placed, with said partition being a part of said gas turbine housing; in which said partition is provided with a plurality of ribs, some of which project radially inwardly to border on said generator housing, and some of which project radially outwardly; and which includes an insulated cover which borders on said radially outwardly projecting ribs, said ribs projecting in such a way that cooling channels are formed on both sides of said partition in said primary and secondary chambers.

5. A gas turbine engine according to claim 4, in which said cooling channels extend helically.

6. A gas turbine engine according to claim 3, in which the radially inner side of said partition is smooth, and in which said generator housing is provided with ribs which project radially outwardly and border on said smooth inner side of said partition.

7. A gas turbine engine according to claim 1, in which said turbine includes a wheel, and in which said compressor air which is supplied to said generator rotor is also supplied to said turbine wheel for cooling same.

* * * * *